United States Patent [19]
Borucki

[11] Patent Number: 5,332,238
[45] Date of Patent: Jul. 26, 1994

[54] SURFACE ACOUSTIC WAVE TOUCHSCREEN SEALING SYSTEM

[75] Inventor: Gregory Borucki, Hinsdale, Ill.

[73] Assignee: Restaurant Technology, Inc., Oak Brook, Ill.

[21] Appl. No.: 515

[22] Filed: Jan. 4, 1993

Related U.S. Application Data

[63] Continuation of Ser. No. 738,079, Jul. 30, 1991, abandoned.

[51] Int. Cl.$^5$ .............................................. C16J 15/32
[52] U.S. Cl. ...................................... 277/228; 277/12; 277/237 R; 277/DIG. 6
[58] Field of Search ................. 277/12, 101, 227, 228, 277/237 R, DIG. 6, 229; 52/398, 399; 235/462

[56] References Cited

U.S. PATENT DOCUMENTS

| | | | |
|---|---|---|---|
| 1,006,490 | 10/1911 | Lord | 277/101 |
| 2,082,348 | 6/1937 | Le Tarte | 277/228 X |
| 3,427,776 | 2/1969 | Lake et al. | 277/DIG. 1 X |
| 3,512,303 | 5/1970 | Wright | 49/488 X |
| 3,558,145 | 1/1971 | Charewicz et al. | 277/228 |
| 4,259,135 | 3/1981 | Kulla | 52/399 X |
| 4,295,654 | 10/1981 | Kawamura et al. | 277/95 X |
| 4,572,592 | 2/1986 | Haven | 358/248 |
| 4,675,569 | 6/1987 | Bowman et al. | 178/18 |
| 4,687,885 | 8/1987 | Talmage et al. | |
| 4,794,240 | 12/1988 | Schorr et al. | 235/462 X |
| 4,797,514 | 1/1989 | Talmage et al. | |
| 4,816,811 | 3/1989 | Bogatin et al. | 178/188 |
| 4,821,029 | 4/1989 | Logan et al. | |
| 4,822,957 | 4/1989 | Talmage et al. | |
| 4,914,624 | 4/1990 | Dunthorn | |
| 4,933,660 | 6/1990 | Wynne, Jr. | |
| 5,005,329 | 4/1991 | Schorr | 235/462 X |
| 5,042,821 | 8/1991 | Bontly | 277/12 |

FOREIGN PATENT DOCUMENTS 280873 12/1964 Netherlands .................. 277/228

OTHER PUBLICATIONS

Preliminary IntelliTouch Systems Manual, Elographics, Inc. (Mar. 19, 1988) pp. 1 through 10, and accompanying specification (the "Elographics Manual").

*Primary Examiner*—William A. Cuchlinski, Jr.
*Assistant Examiner*—Daniel G. DePumpo
*Attorney, Agent, or Firm*—Jenner & Block

[57] ABSTRACT

A surface acoustic wave touchscreen sealing system and method is provided. The sealing system provides a liquid impermeable seal between the touchscreen surface and touchscreen housing to protect the electronic components of the touchscreen. The sealing system includes an elongated body of resiliently compressible self-supporting foam material that is substantially transmissive to surface acoustic wave energy. The elongated body has one outer surface or face of open cell material for contacting the touchscreen surface and ensuring acoustic decoupling. The elongated body further includes at least one outer skin or membrane surface or face that is a liquid impermeable barrier and extends between the touchscreen and the housing. Compression of the elongated body against the touchscreen surface provides a liquid impermeable seal at the interface of the membrane surface portion of the body and the touchscreen.

20 Claims, 2 Drawing Sheets

SURFACE ACOUSTIC WAVE TOUCHSCREEN SEALING SYSTEM

This is a continuation of copending application Ser. No. 07/738,079 filed on Jul. 30, 1991 now abandoned.

FIELD OF THE INVENTION

The present invention relates to methods and apparatus for sealing a touchscreen to protect the display and internal electronics from damage caused by liquid spills without impairing the operation of the touchscreen. More particularly, the invention is directed to touchscreens employing surface acoustic wave (SAW) technology and to sealing systems and methods which do not adversely affect the operation of the SAW touchscreen.

BACKGROUND OF THE INVENTION

Touchscreens have been used for some time for user interfaces to computers and computer-based systems. They offer advantages over other user interface hardware such as keyboards and other remote, non-graphic devices, e.g., the "mouse." The touchscreen eliminates external hardware, is simpler and more intuitive to use, and thus reduces expense, space requirements, maintenance, and the need for user training. The touchscreen permits direct association between the screen display and user input, and as such is more "user friendly" than external keyboards and other remote devices.

A particularly popular application for touchscreens is in point-of-sale (POS) systems in retail stores and restaurants. POS systems incorporate order taking, cash register, inventory control and other functions. The POS display can be readily updated to reflect changes in inventories, menus and prices. The touchscreen is easy to use, permits quick and efficient order taking and cash register functions, and requires little user sophistication or technical knowledge.

Touchscreens have been implemented in several technologies, including those using infrared sensors, capacitive contacts and resistive membrane overlays. A relatively new touchscreen system known in the art employs surface acoustic wave (SAW) technology, which offers several advantages over other technologies. A SAW touchscreen requires only a thin, transparent panel, which may be glass, over the display and is desirable in display applications where brightness, contrast and packaging are critical. SAW touchscreens can also provide a third coordinate, or z-axis, in addition to the conventional x-y coordinates. This input is proportional to touch pressure and provides enhanced software flexibility.

Surface acoustic waves are mechanical waves which propagate in the surface of the medium in which they are generated. SAW touchscreens utilize high-frequency acoustic waves generated by transducers which travel over the surface of the screen at a precise, known speed. These waves are reflected by arrays of reflectors located on the perimeter of the screen to provide a scan of the x and y coordinate axes of the screen. When the screen is touched, the touching device (e.g., a finger or stylus) absorbs a portion of the SAW energy, attenuating the x and y signals. By measuring the time at which the attenuation occurs on each axis and comparing the position of the attenuation relative to the scanning signal envelope, the location of the touch can be calculated.

The touchscreen itself may be a glass plate which is mounted in a housing over the face of a display panel such as a CRT, LCD, gas plasma or other type of display. The touchscreen plate should be evenly supported around its edges. The housing contains the electronic hardware necessary to drive the display and operate the touchscreen. It is desirable to protect the display, internal electronics, transducers and reflective arrays from contamination by moisture and foreign matter. This is particularly true in applications such as restaurants where there is a likelihood that food and beverages may from time to time be spilled on the touchscreen.

A need exists for an effective and useful liquid impermeable seal between the touchscreen and the housing. Soft durometer materials such as caulking, although capable of providing such a seal, absorb significant amounts of SAW energy so as to render the touchscreen inoperable. Such soft durometer materials that can provide a liquid impermeable seal not only impair the propagation of waves across the touchscreen, but also acoustically couple the screen and can cause a false touch to be registered around the entire perimeter of the screen. On the other hand, known sealing materials of a hard durometer do not absorb SAW energy sufficiently to trigger a false touch, but also do not provide a liquid impermeable seal because liquids leak between the seal and the glass by capillary action.

SUMMARY OF THE INVENTION

In accordance with one aspect of the present invention the problems of the prior art are overcome by providing a liquid impermeable seal for the surface of a SAW touchscreen which is impervious to liquids spilled thereon yet allows SAW energy to freely propagate through the seal and across the screen.

In accordance with a further aspect of the invention, a seal is provided that can be located within the active area of the SAW touchscreen, thus protecting the transducers and reflective arrays as well as components mounted within the housing.

In accordance with another aspect of the invention a method and structure are provided for evenly supporting the touchscreen around its edges without impairing its operation.

In accordance with another aspect of the invention an economical and easily installed sealing system is provided that can be adapted for mass production techniques.

In one embodiment, the sealing system in accordance with the invention for forming a liquid impermeable seal and barrier between a touchscreen and housing comprises at least one elongated body or strip of resiliently compressible self-supporting foam material which can be either open or closed cell but is preferably closed cell foam with one or more open cell surfaces, as hereafter described. The foam material is substantially transmissive to surface acoustic wave energy. The elongated body has one outer open cell surface or face for contacting the touchscreen surface and at least one outer skin or membrane surface or face that is a liquid impermeable and preferably a non-liquid retaining barrier extending between the touchscreen and the housing. The membrane may be the same type of material as the foam and may be integral with the foam body. The foam may be a synthetic polymer material. Structure is provided for maintaining the strip in position between the touchscreen and the housing so that the membrane or skin surface contacts the touchscreen and extends away from the touchscreen, usually in a direction normal to the touchscreen surface. Structure is provided for compressing the strip between the touchscreen and the housing to form a liquid impermeable seal at the interface of the skin or membrane surface and the touchscreen.

The structure holding the strip in position can be a channel in the housing wherein the strip is at least partially inserted therein.

The structure for compressing the strip can include structure for maintaining a space, which generally is a predetermined space between the surface of the touchscreen and the housing.

Preferably, a liquid impermeable seal is also formed between the channel of the housing and the closed cell portion of the strip.

The strip may be composed of a body of flexible closed cell foam having an exposed surface of open cell foam for contacting the touchscreen surface to decouple the foam from the glass. The open cell surface portion is disposed on and in contact with the touchscreen surface, thereby supporting the seal on the touchscreen through the open cell portion and ensuring that the seal is acoustically decoupled from the touchscreen. Suitable materials for making the sealing strip in accordance with the invention include polymer materials that can be formed in open cell and closed cell form, such as neoprene. Preferably, the strip has a rectangular cross-section having four sides, at least one of the sides or faces defining a membrane or skin-like layer over the closed cell foam and one of the sides or faces having an open cell surface. Other configurations are contemplated by the invention. For example, two opposed sides of the rectangular cross-section can be defined by a liquid impermeable membrane or skin-like layer over the closed cell foam.

Typically, the body of resiliently compressible material that is utilized will have a rectangular cross-section and should be substantially transmissive to surface acoustic wave energy and preferably also include a liquid impermeable membrane, skin or other thin portion on the surface of the body for forming a liquid impermeable, and preferably a non-liquid retaining, barrier extending between the touchscreen and the housing. Thus, at least the body of self-supporting resiliently compressible material has a liquid impermeable surface that when oriented with respect to the touchscreen and housing extends from the touchscreen surface preferably in a direction that is generally normal to the touchscreen surface. The open cell portion of the foam should be at least that surface portion that rests on the touchscreen surface. The body of the foam should be dimensioned so that it is self-supporting and should not be dense enough to absorb significant amounts of SAW energy to adversely affect performance of the touchscreen. The attenuation of SAW energy transmitted through the width of the elongated body and membrane portion or portions should be less than one-half the threshold at which the touchscreen registers a touch.

In accordance with another aspect of the present invention, a surface acoustic wave transmissive gasket for forming a liquid impermeable seal on the surface of a touchscreen provided. The surface acoustic wave transmissive gasket includes a body of surface acoustic wave transmissive material composed of resiliently compressible closed cell foam material having a liquid impermeable membrane or skin surface which may be integral with the foam body. Preferably the liquid impermeable membrane surface surrounds the entire transverse perimeter of the elongated body. The body of closed cell foam has a quadrilateral or triangular transverse cross section or otherwise has a cross-sectional shape that defines at least one corner. In use, preferably essentially only one corner of the body contacts the touchscreen surface. Preferably, the elongated body has a right-trapezoidal transverse cross-section. In this embodiment, essentially only a corner of the body should contact the touchscreen. For a right trapezoid cross-sectional seal, the seal is preferably oriented so that the corner formed by the intersection of the longer trapezoid base and the non-right angle leg of the right trapezoid cross-section contacts the touchscreen for forming a liquid impermeable seal when the corner is compressed against the touchscreen surface and the bases of the trapezoid are normal to the touchscreen surface.

In accordance with another aspect of the invention, a method of sealing a touchscreen in a housing is provided. The method includes positioning an elongated body of resiliently compressible self-supporting foam material between the touchscreen and the housing, the foam material being substantially transmissive to surface acoustic wave energy and having at least an open cell surface portion with the remainder of the foam being closed or open cell foam and a membrane or skin surface for providing a liquid impermeable barrier that extends from the touchscreen to the housing. The body is compressed between the touchscreen and the housing to form a liquid impermeable seal at the interface of the membrane or skin surface portion of the body and the touchscreen. The method may also include the additional step of maintaining a space between the touchscreen and the housing so that the surface acoustic wave energy can freely propagate over the surface of the touchscreen.

These and other aspects and advantages of the invention will be more fully appreciated and understood upon consideration of the following detailed description of preferred embodiments with reference to the accompanying drawings.

DETAILED DESCRIPTION OF THE PREFERRED EMBODIMENTS

Figure 1:
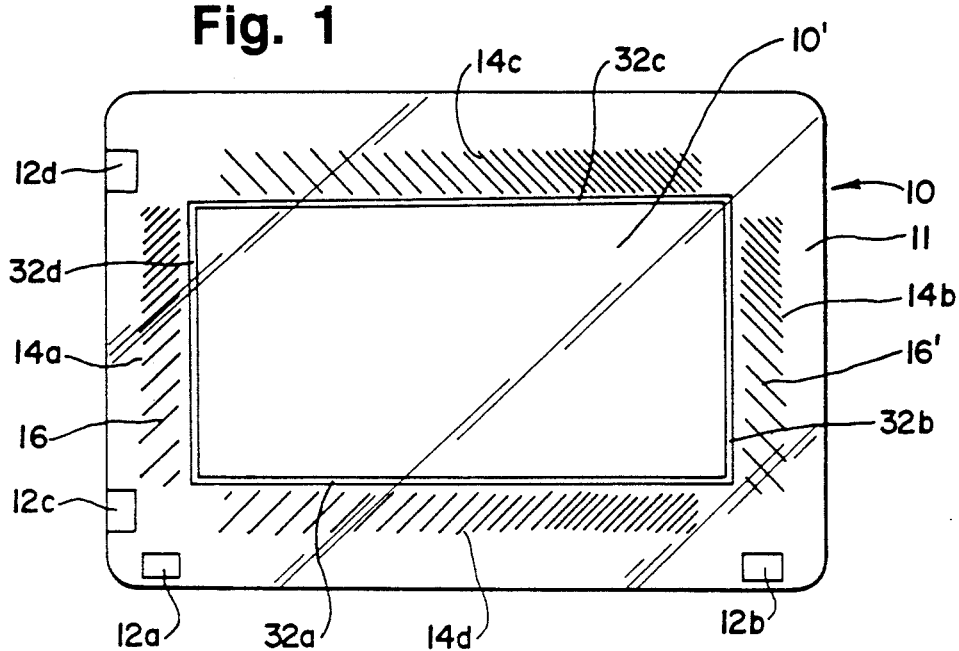
FIG. 1 is a plan view of the preferred embodiment, illustrating a typical layout of the touchscreen showing the location of the seal, the transducers, and the reflector arrays.

In order to understand the present invention, it is helpful to begin with a brief description of the general design and operation of a SAW touchscreen system. As shown in FIG. 1, a touchscreen 10 is provided that includes a transparent glass plate 11. Commercially available touchscreens are typically glass, but other hard, transparent materials such as plexiglass or polycarbonate could probably be used. SAW energy is coupled to and extracted from touchscreen 10 by four identical piezoelectric transducers 12 *a-d* and nearly invisible reflector arrays 14*a-d* around the perimeter of glass plate 11. The rectangular area within the four corners defined by transducers 12*a-d* may be considered the active area of touchscreen 10. Reflector arrays 14*a-d* are composed of fired-on glass frits 16 of a slightly different density than that of glass plate 11. The width of reflector arrays 14*a-d* and transducers 12*a-d* is proportional to the x-y dimensions of the touchscreen 10. Each axis has a transmitting and a receiving transducer and a pair of mirror-image reflector arrays. In the illustrated embodiment, transducers 12*a* and 12*b* transmit and receive, respectively, for the x-axis utilizing mirror-image reflector arrays 14 *a* and *b*. For the y-axis, transducers 12 *c* and *d* transmit and receive, respectively, utilizing mirror-image reflector arrays 14 *c* and *d*.

Figure 2:
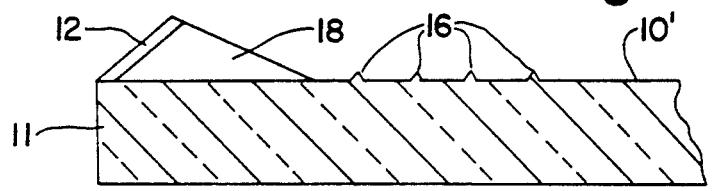
FIG. 2 is a detail view showing the mounting of a transducer to the surface of the touchscreen.

As shown in FIG. 2, transducers 12 are mounted to coupling wedges 18 which in turn are mounted to glass plate 11 or touchscreen 10. In operation, a short burst of RF energy is applied to the transmitting transducer of one axis, causing the transmitting transducer to vibrate and producing bulk mechanical waves in coupling wedge 18 to which the transmitting transducer is mounted. Coupling wedge 18 is of such shape and orientation as to couple the bulk waves to glass plate 11. At the wedge-glass interface, the bulk waves are converted to SAW energy which then propagates through air over the surface of reflector array 14 and the surface of glass plate 11.

Referring again to FIG. 1, as the SAW wave packet generated by transducer 12*a* travels over the surface of reflector array 14*a*, a small portion of the energy is reflected by each of frits 16, with the balance of the energy continuing to propagate down array 14*a*. The reflected portion travels at a right angle across the screen and is reflected again by a mirror image frit 16' in array 14*b* on the opposite side, this time being directed at another right angle toward receiving transducer 12*b*. The burst signal is recovered at receiving transducer 12*b* as the sum of all the reflected energy, and is a signal much longer in time than the original transmitted pulse. The limits of the recovered signal are a function of the minimum and maximum path lengths around the screen. This process is repeated periodically at the system operating frequency, alternately for the x and y axes.

Figure 3:
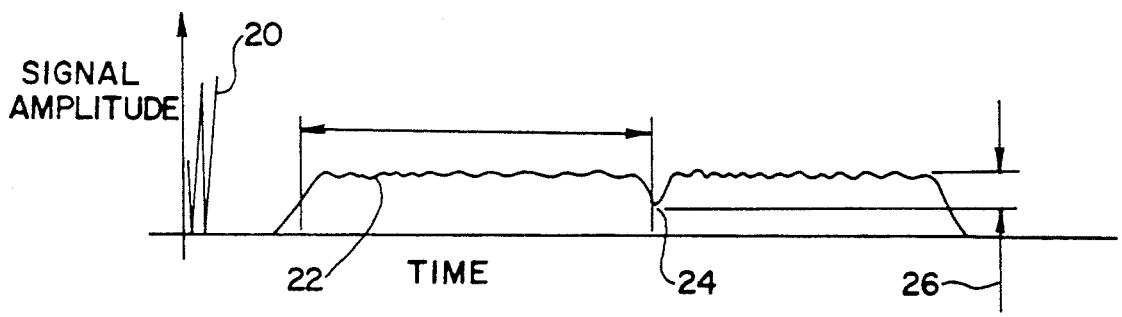
FIG. 3 is a graphical representation of the transmitted and received SAW waveforms showing the relationship of a transmitted pulse, received signal and touch on a single axis.

When the surface 10' of touchscreen 10 is touched, the touching instrument absorbs a portion of the SAW energy in the glass under the location of the touch. This causes an attenuation or "dip" in the received signal at a time precisely associated with the location of the touch. FIG. 3 shows the relationship on the time axis of a transmitted signal 20, a received signal 22, and a dip 24 caused by the touch. SAW systems can also develop a z axis coordinate related to touch pressure 26, based on the degree of absorption of energy. This is because the degree of absorption is determined by the area of contact, which is in turn a function of pressure for fingers and other soft materials.

Figure 4:
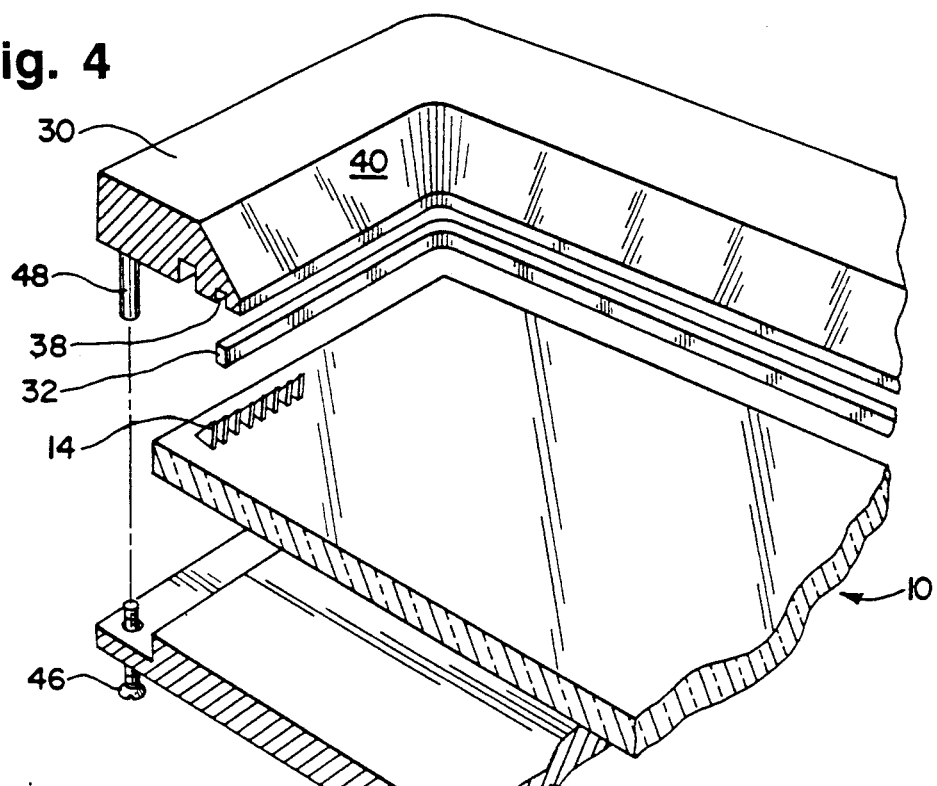
FIG. 4 is a perspective view of the entire touchscreen assembly showing the mounting of the touchscreen, display and seal in the housing.

The SAW touchscreen system utilizes a microprocessor-based controller with memory and peripheral hardware, including RF amplifiers, a burst amplifier, an AM detector, a comparator and a digital-to-analog converter. Typically, this controller will communicate with a host computer system via an appropriate interface. As shown in FIG. 4, the controller hardware is mounted on a circuit board 28 which is most conveniently located inside a housing 30 together with the display hardware.

It has been discovered that a seal composed of an elongated body of flexible, self-supporting foam material having one surface of open cell foam material will provide a liquid impermeable barrier and seal without adversely affecting the operation of the SAW touchscreen. Preferably, at least one surface of the elongated body is composed of a membrane or skin surface that is liquid impermeable, which may be integral with the foam material. As used herein, the term "liquid impermeable" means that water and similar liquids, such as milk, juice and other water-based fluids, will not pass through the seal or the interface of seal 32 and the surface 10' of touchscreen 10. The body of foam material should be self-supporting, but because of its open pore surface in contact with the touchscreen will not absorb significant amounts of SAW energy.

The liquid impermeable skin or membrane can be of the same material as the closed cell foam body and preferably is formed as an integral part of the foam body, which may be done during the manufacture of the foam by molding or extruding. The thickness of the membrane is not critical as long as it is liquid impermeable and does not cause excessive attenuation of the SAW signal. Typical skin thicknesses are estimated to be in the range of from about 0.01 to 0.025 inches. Flexible plastic foams are suitable for use in accordance with the invention. Typical flexible plastic foams include polyurethane, rubber latex, polyethylene and vinyl polymers. Typically, the density of the foam should be in the range of from about seven to twelve pounds per cubic foot. Such foam is commercially available in sheets or rolls having an integral membrane or skin surface. The open cell surface can be obtained by cutting through a body of foam having a skin or membrane surface with a knife, razor blade or other sharp instrument. The portion of the foam body along the cut will have an open cell surface and is suitable for being laid on the touchscreen surface.

Vinyl foam material has been shown to be suitable for use at the audio frequency employed in the Intellitouch Model E-264 SAW touchscreen system manufactured by Elographics, Inc. While it is believed that the aforementioned foam materials are suitable for use in accordance with the invention, other SAW touchscreens which operate at different audio frequencies may require a different material. Materials can be easily tested to determine their suitability for use at a given frequency. The material should have the appropriate density and acoustic characteristics such that it is substantially transmissive to SAW energy. In other words, it will allow SAW energy at the selected audio frequency to propagate through the material without significant attenuation so that a false touch is not registered by the touchscreen or so that the operation of the touchscreen is not adversely affected. The percentage of SAW energy which the seal should transmit will vary depending on the specifications of the particular SAW touchscreen, and may be affected by the adjustable sensitivity of some SAW touchscreens. In any event, the attenuation of SAW energy transmitted through the seal must be less than the threshold level of attenuation at which the touchscreen will register a touch.

Figure 5:
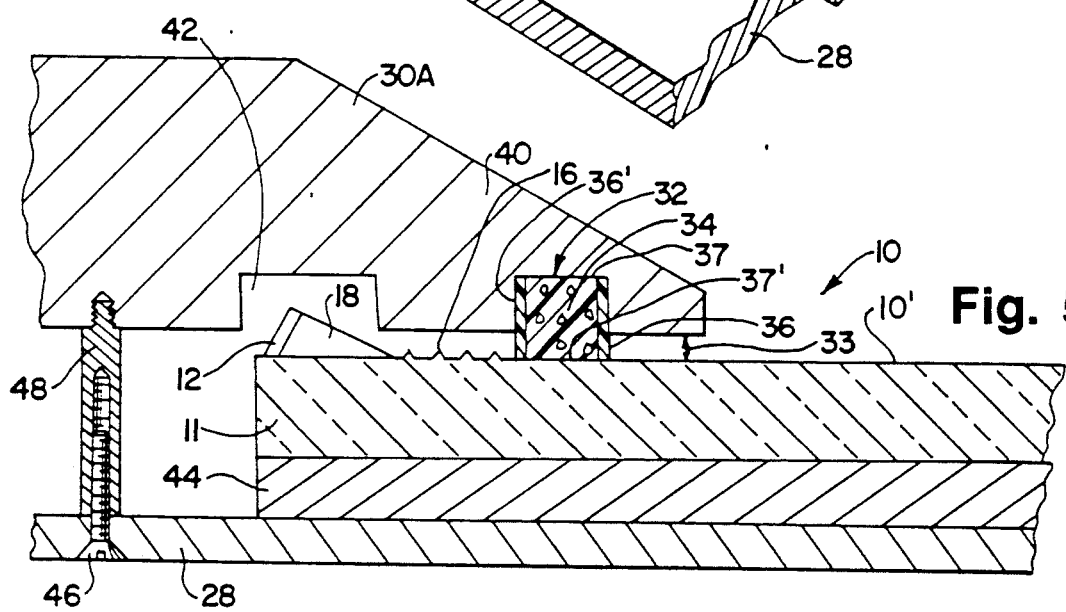
FIG. 5 is a cross-section of the preferred embodiment showing the arrangement of the seal with respect to the housing, the touchscreen, the reflector arrays and the transducers.

In the embodiment shown in FIG. 5, seal 32 is formed of thin strips of closed cell foam. The strips may be cut from a sheet of the foam material having a skin or membrane surface 36 and 36' on each side of the sheet material. The sheet thickness is thus equal to the width of the resulting foam body used for the seal in accordance with the invention with the membrane surfaces 36,36' being normal to the touchscreen surface and facing to and away from the active touchscreen area. Only a single skin or membrane surface 36 is needed, preferably on the side facing towards the screen (away from frits 16) to provide an adequate seal. However, it is convenient to simply use the readily available sheets having the skin or membrane surface 36 and 36' on two sides as illustrated in FIG. 5 which are cut to form seal 32 of a desired height. As shown in FIG. 5, the top and bottom portions 37 and 37', respectively, of seal 32 are an open cell surface formed by cutting through the body closed cell material. Thus, each strip will have a core of closed cell material 34 with a skin or membrane layer 36,36' on each side. Although the exact dimension is not critical, a 1/16" wide strip is adequate to provide a good seal, with each skin or membrane surface 36 and 36' being about 0.015 inches thick, for example. The thickness of the skin or membrane surface or surfaces should not be so great as to cause significant attenuation of the SAW signal that. The acceptable attenuation per signal pass through the seal will depend on the sensitivity of the particular touchscreen. The more absorptive of SAW energy the material, the less surface area of material can be in contact with the touchscreen.

As shown in FIG. 5, a strip of foam is mounted in a channel 38 located in an escutcheon 40 of upper housing 30A so that seal 32 contacts touchscreen 10 just inside the location of reflector arrays 14. Adhesive may be used to secure seal 32 in channel 38; however, adhesive should not be used to bond seal 32 to touchscreen 10 as this has been found to cause unacceptable absorption of SAW energy. Housing 30 may have appropriate cutouts 42 to accommodate transducers 12a-d. To avoid acoustic coupling, neither touchscreen 10 nor transducers 12a-d should come into contact with housing 30. Thus, there must be a small air gap 33 between touchscreen 10 and upper housing 30A as shown in FIG. 5. A gap on the order of 0.005 to 0.010 inch is sufficient. Display 44 and circuit board 28 are mounted behind or below touchscreen 10. By tightening the screws 46 into the post 48, touchscreen 10 is held against escutcheon 40 by display 44 and circuit board 28. This pressure slightly compresses the foam of seal 32, resulting in a liquid impermeable seal. This mounting system is effective where housing 30 is uneven, as in an injection-molded plastic housing, and the foam must compress unevenly in order to seal. This system also provides even support for touchscreen 10 on all sides.

With reference to FIG. 1, seal 32 is located inside the active area of the touchscreen, preferably just inside reflector arrays 14a-d. This location affords complete protection to reflector arrays 14a-d and transducers 12a-d, and does not impinge on the available useful area of touchscreen 10. Seal 32 may be a single strip (not shown) wrapped around the entire perimeter of touchscreen 10, or it may be constructed of individual strips 32a-d, one for each side of touchscreen 10 as shown in FIG. 1. In the latter case, the sealing strips may be joined at the corners by miter or simple butt joints so long as the strips are fitted tightly together to provide liquid tight joints. Adhesive may be used to secure the corners, but should not be used to secure seal 32 to touchscreen 10.

As previously discussed, it is only necessary to have one outer membrane or skin layer of liquid impermeable material in contact with the touchscreen to form an adequate seal at the interface of seal 32 and touchscreen 10, which would preferably be membrane surface 36' in FIG. 5, if only one membrane surface was to be utilized. The foam primarily supports the membrane portion (which provides the liquid barrier and prevents liquid retention) and facilitates mounting.

Figure 6:
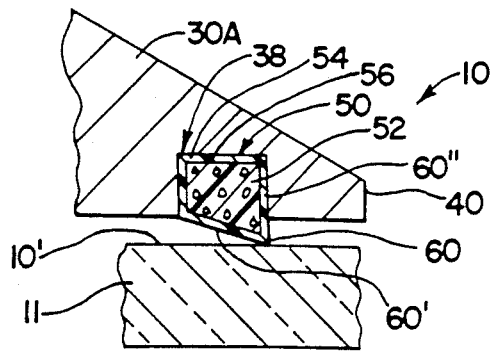
FIG. 6 shows a transverse cross-section of the seal showing an alternative embodiment of the invention.

FIG. 6 shows an alternative embodiment of a seal 50 in accordance with the invention and composed of an elongated body of closed cell flexible, compressible foam 52 (which alternatively could be open cell foam) having a right-trapezoidal transverse cross-section. A liquid impermeable and non-liquid retaining membrane or skin 54 forms a layer around foam 52. Seal 50 thus has two portions, the foam portion 52 and the membrane surface 54. The top portion 56 of seal 50 fits into channel 38 in escutcheon 40 of upper housing 30A. The corner 60 formed by the intersection of the longer trapezoidal base 60" and the non-right angle leg 60' of the right trapezoidal cross-section of seal 50 contacts the surface of touchscreen 10 for forming a liquid impermeable seal where corner 60 is compressed against touchscreen surface 1-10'. The bases of the trapezoidal cross-section are perpendicular to the surface of touchscreen 10. Since essentially only corner 60 contacts touchscreen 10, the area of contact with touchscreen 10 is limited to the minimum necessary to form a liquid impermeable seal. Since corner 60 may be somewhat compressed, more than a single point may contact touchscreen 10, but the contact area is still minimized as a result of the trapezoidal geometry. The right trapezoidal transverse cross-sectional shape is preferred since it can also present a face (base 60") which is perpendicular to touchscreen 10 and faces the area of touchscreen 10 that may have contact with liquids, such as from a spill. This makes the screen easier to clean by helping to reduce the development of a meniscus of fluid at the junction of seal 50 and touchscreen 10. Of course, other geometric configurations which would achieve the same results, essentially by presenting a cross-sectional point of contact with the screen, would also be acceptable. The principal advantage of this embodiment is that the seal 50 may be manufactured as a one-piece gasket by extruding a right-trapezoidal cross section, creating the foam body in the desired size and configuration and having a liquid impermeable and non-liquid retaining membrane or skin surface. The completed gasket could then simply be placed into position in the housing 30. This method lends itself to mass production techniques.

While the invention has been described with respect to certain embodiments, it is to be understood that the invention is capable of numerous rearrangements, changes and modifications. It is intended to cover all such rearrangements, changes, modifications and equivalents that may be included within the scope of the following claims.

I claim:

1. A sealing system for forming a liquid impermeable seal and barrier between the surface of a surface acoustic wave touchscreen and a housing comprising:
   at least one elongated body of resiliently compressible self-supporting foam material having an open cell surface disposed on the surface of the surface acoustic wave touchscreen, said open cell surface being substantially transmissive to surface acoustic wave energy, said body having at least one liquid impermeable membrane surface portion, said membrane surface portion forming a liquid impermeable barrier extending between said surface acoustic wave touchscreen surface and said housing;

means for maintaining said body in position between said surface acoustic wave touchscreen and said housing so that said membrane surface portion contacts the surface acoustic wave touchscreen surface and extends away from said surface acoustic wave touchscreen; and means for compressing said body between said surface acoustic wave touchscreen and said housing to form a liquid impermeable seal at the interface of said membrane surface portion and the surface of said surface acoustic wave touchscreen.

2. The sealing system of claim 1 wherein the means for holding said body in position includes a channel in said housing and said body is partially inserted into said channel.

3. The sealing system of claim 1 wherein said means for compressing said body further includes means for maintaining a space between said touchscreen surface and said housing.

4. The sealing system of claim 1 wherein said body of foam material is closed cell foam having one surface of open-cell foam defining said open cell surface.

5. The sealing system of claim 2 wherein a liquid impermeable seal is formed between said channel of said housing and said membrane surface portion of said body.

6. The sealing system of claim 1 wherein said body of foam material is closed cell polymer material and said membrane surface portion is integral to said body and is composed of the same polymer material.

7. The sealing system of claim 1 wherein said body of foam material has a rectangular cross-section having four sides, one of said sides defining said liquid impermeable membrane surface.

8. The sealing system of claim 7 wherein two of said sides define opposing liquid impermeable membrane surfaces.

9. The sealing system of claim 6 wherein said membrane surface portion has a thickness in the range of from about 0.01 inches to about 0.025 inches.

10. The sealing system of claim 1 wherein said body provides support for said membrane surface portion.

11. The sealing system of claim 1 wherein said elongated body has a width of about 1/16 inch.

12. The sealing system of claim 11 wherein the attenuation of SAW energy transmitted through the width of said elongated body and membrane portion is less than one-half the threshold at which the touchscreen registers a touch.

13. A touchscreen and a housing assembly comprising:

a surface acoustic wave touchscreen having an operative portion, a surface, and means for transmitting and receiving surface acoustic waves across the surface and operative portion of the surface acoustic wave touchscreen;

a housing located above and around the perimeter of the operative portion of the surface acoustic wave touchscreen;

a sealing system for forming a liquid impermeable seal and barrier between the surface of said surface acoustic wave touchscreen and said housing, said sealing system located between said means for transmitting and receiving surface acoustic waves and the operative portion of the surface acoustic wave touchscreen and comprising at least one elongated body of resilient compressible self-supporting foam material having an open cell surface disposed on the surface of said surface acoustic wave touchscreen, said foam material being substantially transmissive to surface acoustic wave energy, said body having at least one liquid impermeable membrane surface portion, said membrane surface portion forming a liquid impermeable barrier extending between said surface acoustic wave touchscreen and said housing;

means for maintaining said body in position between said surface acoustic wave touchscreen and said housing so that said membrane surface portion contacts the surface acoustic wave touchscreen surface and extends away from said surface acoustic wave touchscreen; and means for compressing said body between said surface acoustic wave touchscreen and said housing to form a liquid impermeable seal at the interface of said membrane surface portion and the surface of said surface acoustic wave touchscreen.

14. A method for sealing the surface of a surface acoustic wave touchscreen in a housing comprising the steps of:

positioning an elongated body of resiliently compressible foam material between said touchscreen and said housing, said foam material being substantially transmissive to surface acoustic wave energy and having an open cell surface portion disposed on said touchscreen surface and at least one liquid impermeable membrane surface portion, providing a liquid impermeable barrier and extending from said touchscreen to said housing; and compressing said elongated body between said touchscreen and said housing to form a liquid impermeable seal at the interface of the liquid impermeable membrane surface portion of said elongated body and said touchscreen.

15. The method of claim 14 further including the step of maintaining a space between said touchscreen and said housing.

16. A sealing system for forming a liquid impermeable seal and barrier between the surface of a surface acoustic wave touchscreen and a housing comprising:

an elongated body of surface acoustic wave transmissive material having a transverse cross section that defines at least one corner, said body composed of resiliently compressible self-supporting foam material having a liquid impermeable membrane surface around at least a portion of the perimeter of the transverse cross section, said membrane surface suitable for forming a liquid impermeable barrier extending between the surface acoustic wave touchscreen and the housing, said corner defining a contact surface for the surface acoustic wave touchscreen surface and forming a liquid impermeable seal between the seal and the surface acoustic wave touchscreen surface when the corner is compressed against the surface acoustic wave touchscreen surface;

means for maintaining said body in a position between the surface acoustic wave touchscreen and the housing so that the membrane surface portion contacts the surface acoustic wave touchscreen surface and extends away from the surface acoustic wave touchscreen and said corner contacts the surface of the surface acoustic wave touchscreen; and means for compressing said body between said surface acoustic wave touchscreen and said housing to form a liquid impermeable seal at the interface of said corner and the surface of the surface acoustic wave touchscreen.

17. The sealing system of claim 16 wherein said foam material is closed cell foam material.

18. The sealing system of claim 16 wherein said transverse cross-section is right-trapezoidal having two adjacent sides defining an acute angle therebetween, the intersection of said adjacent sides defining said corner.

19. A sealing system for forming a liquid impermeable barrier and seal between a surface acoustic wave touchscreen and a housing comprising:

a body of resiliently compressible foam material said body being substantially transmissive to surface acoustic wave energy when said body is disposed on the surface of the surface acoustic wave touchscreen and having a liquid impermeable membrane on said body for forming a liquid impermeable barrier extending between the surface acoustic wave touchscreen and the housing;

means for maintaining said body in position between the surface acoustic wave touchscreen and the housing so that the liquid impermeable membrane contacts the surface acoustic wave touchscreen and extends towards and contacts the housing; and means for compressing said body between the surface acoustic wave touchscreen and the housing to form a liquid barrier at the interface of the liquid impermeable membrane and the surface acoustic wave touchscreen.

20. A method for sealing the surface of a surface acoustic wave touchscreen in a housing using an elongated body of resiliently compressible foam material having at least one liquid impermeable membrane surface portion and an open-cell surface portion that is substantially transmissive to surface acoustic wave energy when disposed on the surface of the surface acoustic wave touchscreen, comprising the steps of:

positioning the body on the surface of the surface acoustic wave touchscreen so that the open-cell surface of the body engages the surface of the surface acoustic wave touchscreen, and the liquid impermeable membrane surface extends from the surface acoustic wave touchscreen surface to the housing; and compressing the body between the surface acoustic wave touchscreen surface and the housing to form a liquid impermeable seal at the interface of the liquid impermeable membrane surface portion and the surface of the surface acoustic wave touchscreen.

* * * * *